United States Patent
Lee et al.

(10) Patent No.: US 11,882,533 B2
(45) Date of Patent: Jan. 23, 2024

(54) METHOD FOR TRANSMITTING AUDIO DATA USING SHORT-RANGE WIRELESS COMMUNICATION IN WIRELESS COMMUNICATION SYSTEM, AND APPARATUS THEREFOR

(71) Applicant: LG ELECTRONICS INC., Seoul (KR)

(72) Inventors: Hyeonjae Lee, Seoul (KR); Taeyoung Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 26 days.

(21) Appl. No.: 17/761,530

(22) PCT Filed: Sep. 18, 2020

(86) PCT No.: PCT/KR2020/012634
§ 371 (c)(1),
(2) Date: Mar. 17, 2022

(87) PCT Pub. No.: WO2021/054769
PCT Pub. Date: Mar. 25, 2021

(65) Prior Publication Data
US 2022/0346040 A1    Oct. 27, 2022

(30) Foreign Application Priority Data

Sep. 18, 2019   (KR) .................. 10-2019-0115003

(51) Int. Cl.
*H04W 56/00*    (2009.01)
*H04W 4/80*     (2018.01)
*H04W 4/06*     (2009.01)

(52) U.S. Cl.
CPC ........... *H04W 56/001* (2013.01); *H04W 4/06* (2013.01); *H04W 4/80* (2018.02)

(58) Field of Classification Search
CPC ....... H04W 4/80; H04W 4/06; H04W 56/001; H04W 56/00
See application file for complete search history.

(56) References Cited

U.S. PATENT DOCUMENTS 9,712,266 B2 *  7/2017  Linde ................. H04W 4/80
9,961,392 B2    5/2018  Huang
(Continued)

FOREIGN PATENT DOCUMENTS

KR    1020160120677    10/2016
WO    2016060474       4/2016

OTHER PUBLICATIONS

PCT International Application No. PCT/KR2020/012634, International Search Report dated Dec. 23, 2020, 5 pages.

*Primary Examiner* — Tuan H Nguyen
(74) *Attorney, Agent, or Firm* — LEE, HONG, DEGERMAN, KANG & WAIMEY

(57) ABSTRACT

The present disclosure relates to a method by which a third device transmits audio data in a short-range wireless communication system, and to an apparatus therefor. According to the present specification, the method by which a third device transmits audio data in a short-range wireless communication system comprises the steps of: transmitting, to at least one device, a first advertisement message for providing a broadcast audio data streaming service; transmitting, to the at least one device, a second advertisement message related to synchronization of an audio data output time point, wherein the second advertisement message includes force delay information for synchronizing a time point at which the audio data is output from each of the at least one device; and transmitting the audio data to the at least one device, wherein the time point at which the audio data is output from each of the at least one device is determined on the basis of the force delay information.

6 Claims, 10 Drawing Sheets

(56) References Cited

U.S. PATENT DOCUMENTS

2007/0081562 A1 4/2007 Ma
2018/0098180 A1* 4/2018 Chang .................... H04L 41/00

* cited by examiner

【FIG. 1】
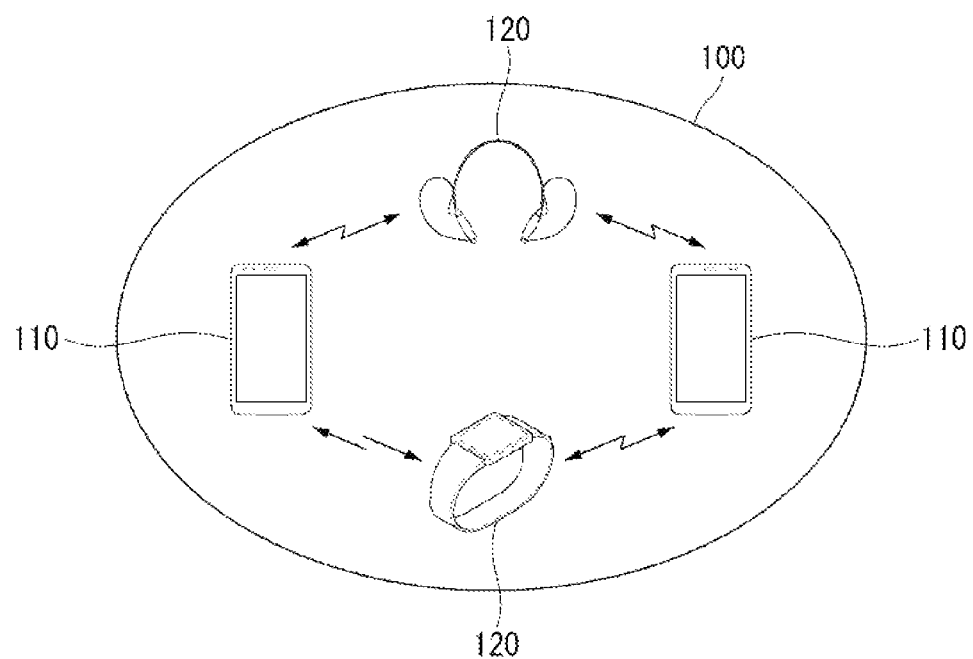

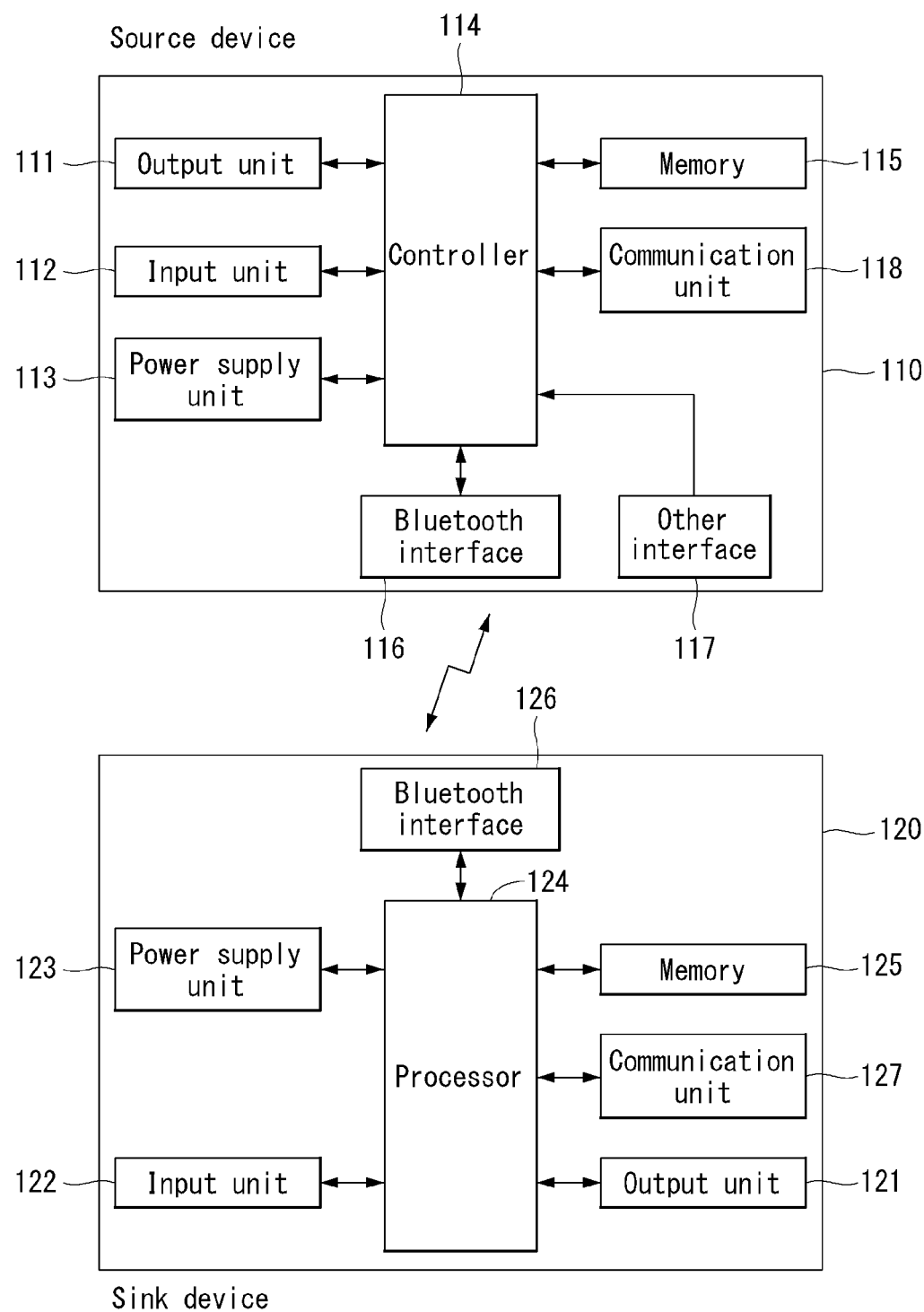
[FIG. 2]

[FIG. 3]
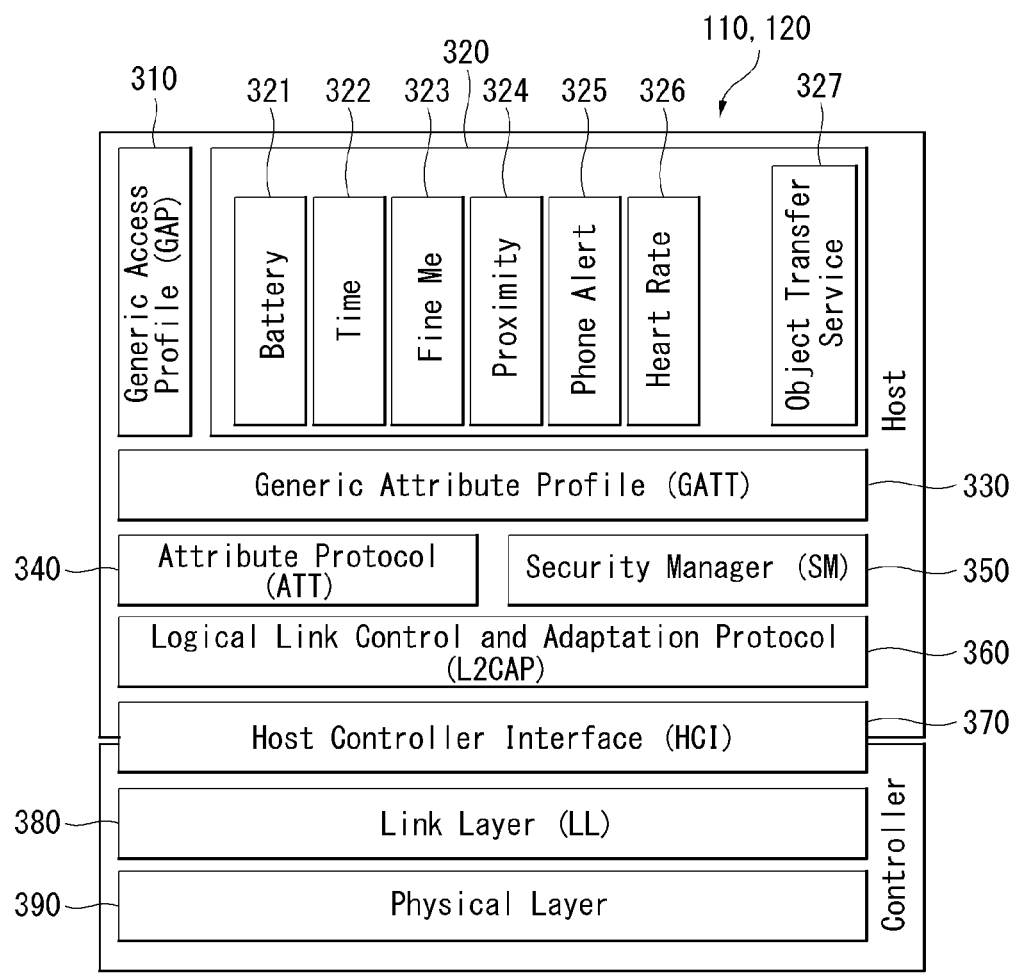

【FIG. 4】
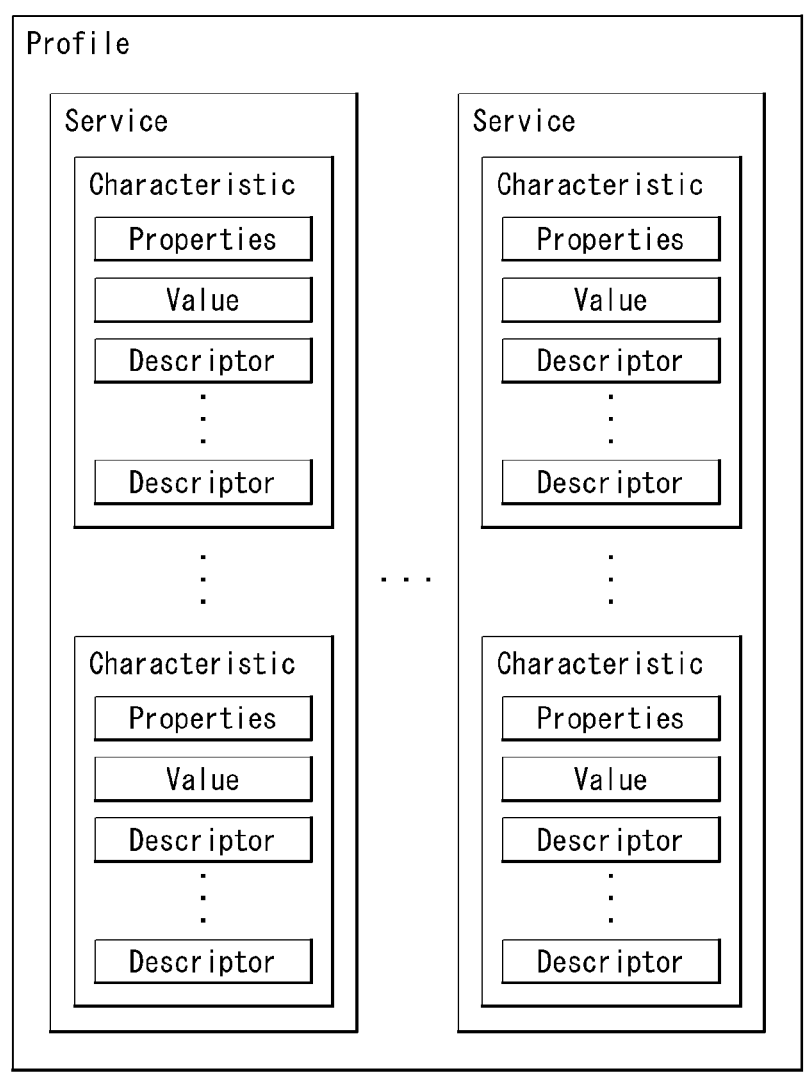

[FIG. 5]
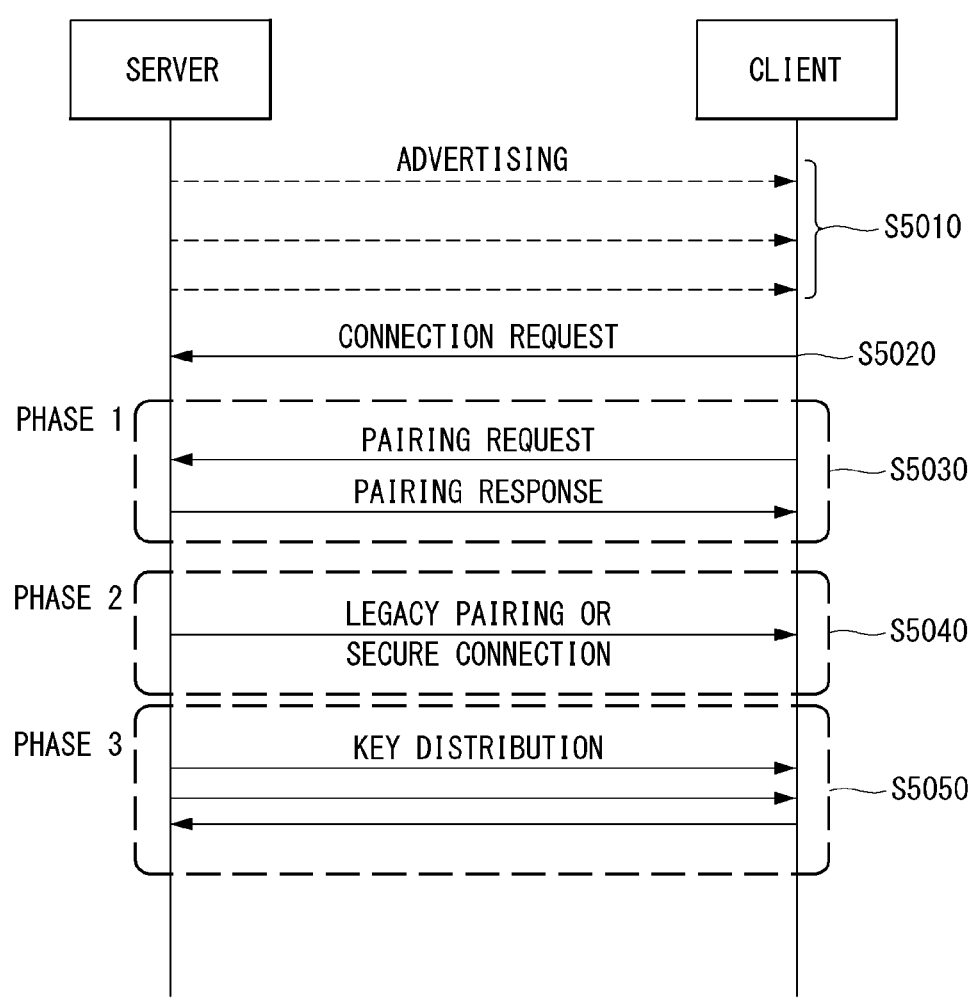

[FIG. 6]
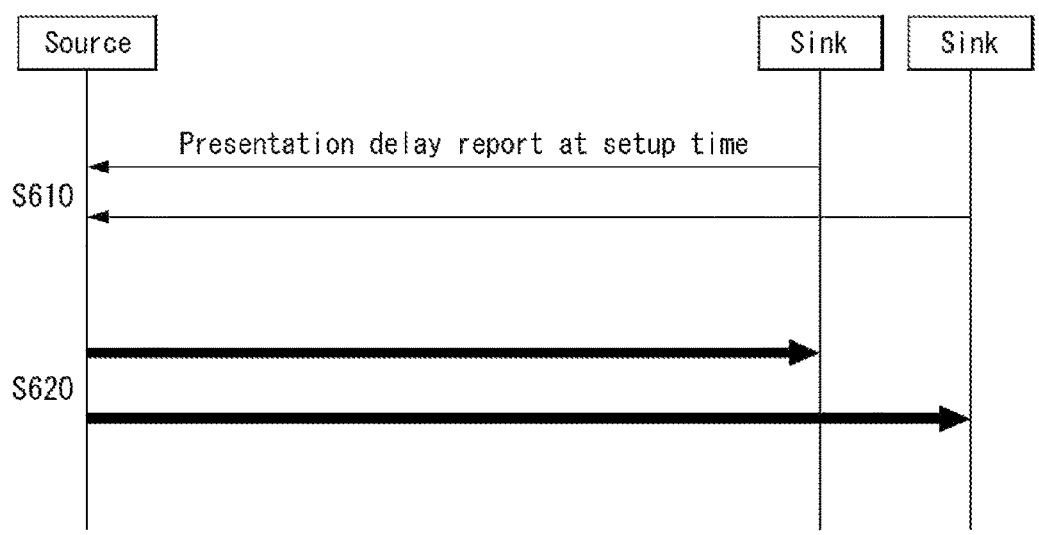
[FIG. 7]
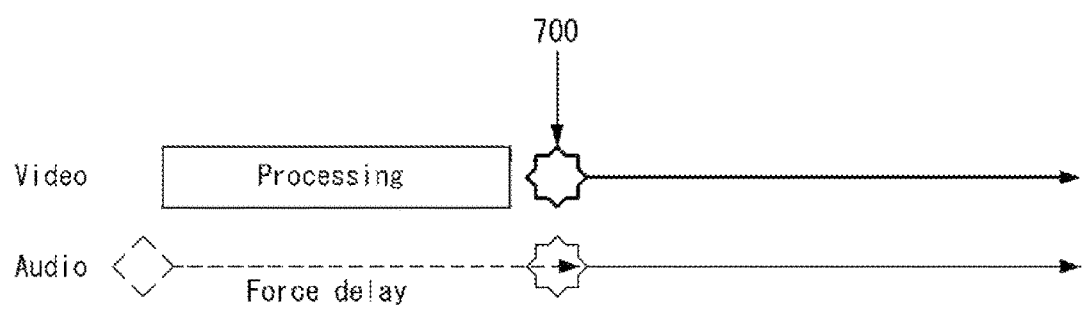

[FIG. 8]
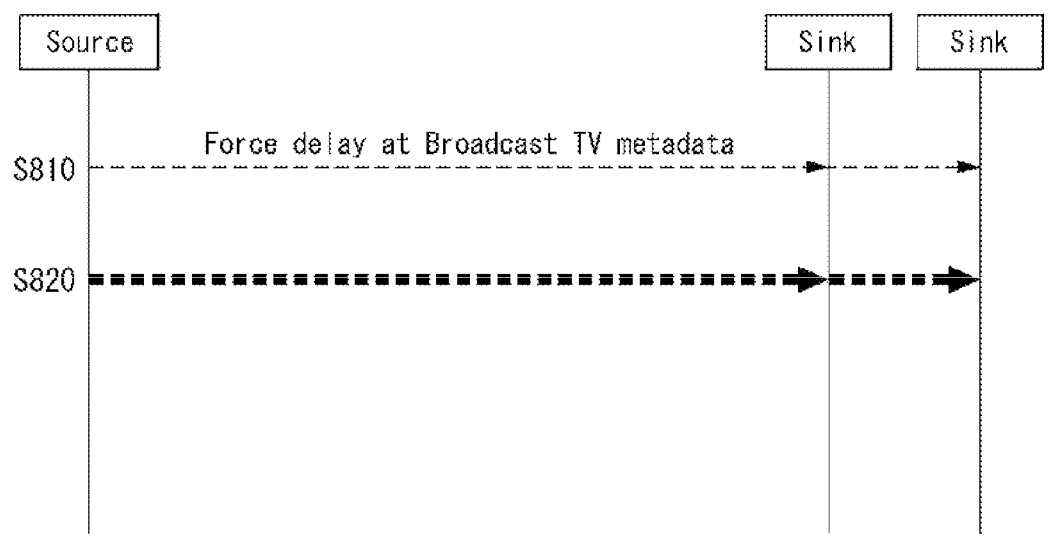

[FIG. 9]
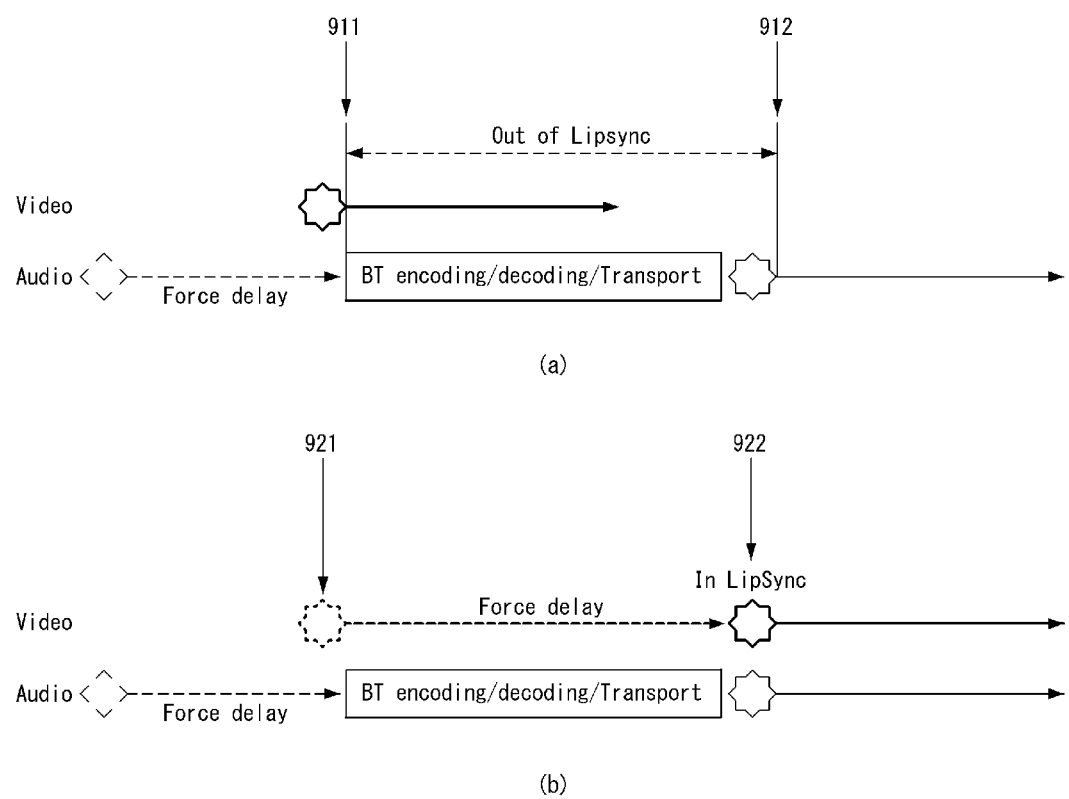

[FIG. 10]
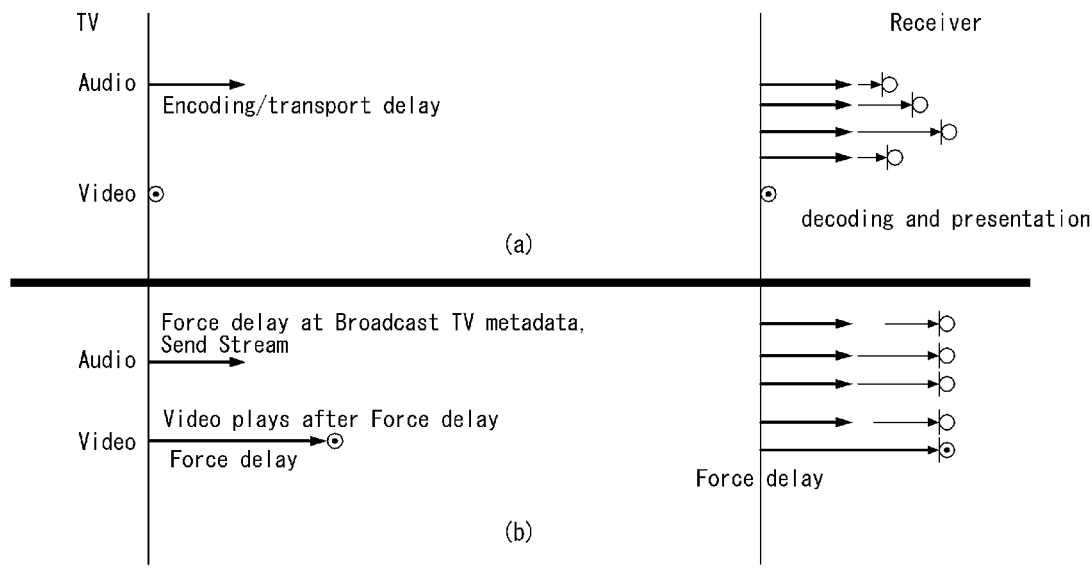
[FIG. 11]
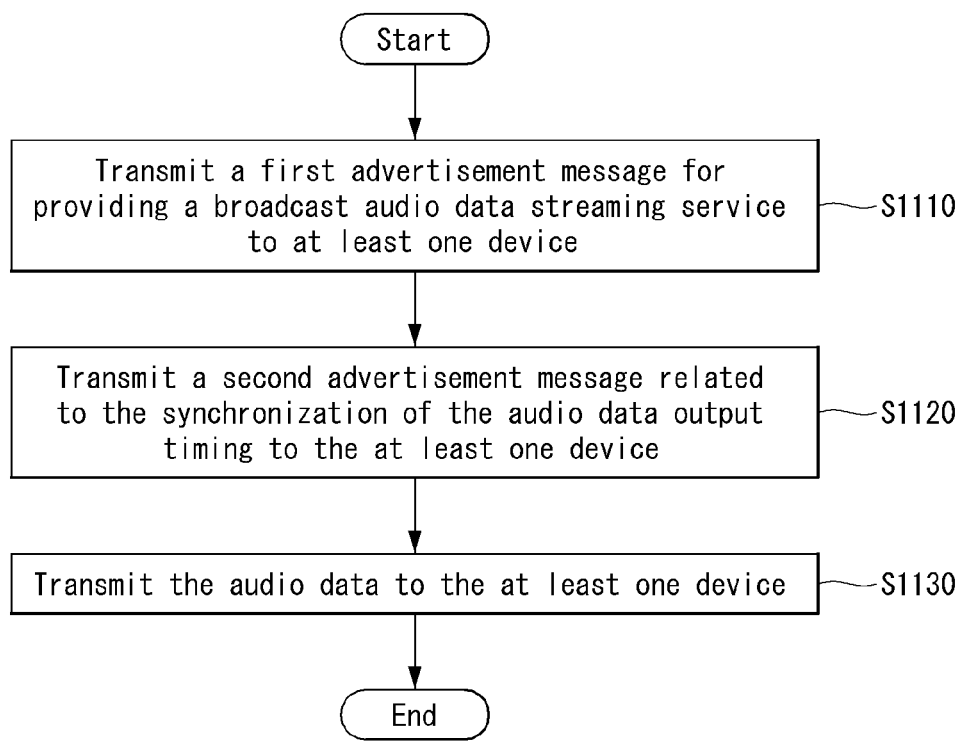

[FIG. 12]
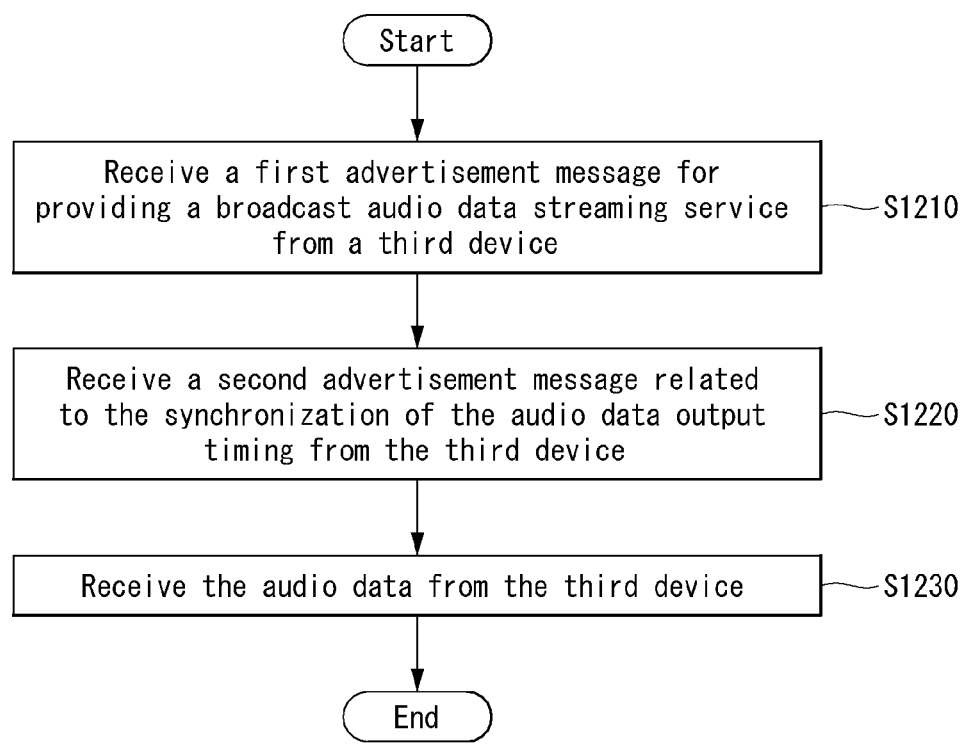

METHOD FOR TRANSMITTING AUDIO DATA USING SHORT-RANGE WIRELESS COMMUNICATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2020/012634, filed on Sep. 18, 2020, which claims the benefit of earlier filing date and right of priority to Korean Application No. 10-2019-0115003, filed on Sep. 18, 2019, the contents of which are all incorporated by reference herein in their entirety.

TECHNICAL FIELD

The present disclosure relates to a wireless communication system, and more particularly, to a method and an apparatus for transmitting audio data using short-range wireless communication.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

The present disclosure is to provide a method and apparatus for transmitting audio data, performed by a third device, using short-range wireless communication in a wireless communication system.

Furthermore, the present disclosure is to provide a method and apparatus for synchronizing audio data output timings of devices that output the audio data, performed by a third device in a wireless communication system.

Technical objects to be achieved by the present disclosure are not limited to the aforementioned technical objects, and other technical objects not described above may be evidently understood by a person having ordinary skill in the art to which the present disclosure pertains from the following description.

Technical Solution

The present disclosure provides a method of transmitting audio data, by a third device, and apparatus therefor.

Specifically, a method of transmitting audio data, by a third device, in a short-range wireless communication system, comprising: transmitting, to at least one device, a first advertisement message for providing a broadcast audio data streaming service; transmitting, to the at least one device, a second advertisement message related to a synchronization of audio data output timing; wherein the second advertisement message includes force delay information for synchronizing a timing at which the audio data is output from each of the at least one device; and transmitting, to the at least one device, the audio data, wherein the audio data output timing of each of the at least one device is determined based on the force delay information.

Furthermore in the present disclosure, further comprising: determining a value of the force delay information based on a processing time for the audio data of the at least one device.

Furthermore in the present disclosure, wherein the force delay information is determined based on a specific time value range in which processing for the audio data is expected to be completed in all of the at least one device.

Furthermore in the present disclosure, wherein the specific time value range is pre-configured, wherein the force delay information is determined as a specific value among values included within the specific time range.

Furthermore in the present disclosure, wherein the audio data output timing of each of the at least one device is determined as a timing indicated by the force delay information.

Furthermore in the present disclosure, wherein the audio data is output at the timing indicated by the force delay information regardless of when the processing for the audio data of each of the at least one device is completed.

Furthermore in the present disclosure, wherein the force delay information is determined further based on a processing time for video data related to the audio data of the third device.

Furthermore in the present disclosure, further comprising: outputting the video data, wherein a video data output timing of the third device is determined based on the force delay information.

Furthermore in the present disclosure, wherein the audio data is output at a timing indicated by the force delay information regardless of when a processing for the audio data of each of the at least one device is completed, and wherein the video data is output at a the timing indicated by the force delay information regardless of when a processing for the video data of the third device is completed.

Furthermore in the present disclosure, wherein a value of the force delay information is greater than a sum of (i) an audio data encoding time of the third device and (ii) an audio data transmission time from the third device to the at least one device, and less than a video data buffering time of the third device.

Furthermore in the present disclosure, a method of receiving audio data, by a first device, in a short-range wireless communication system, the method comprising: receiving, from a third device, a first advertisement message for providing a broadcast audio data streaming service; receiving, from the third device, a second advertisement message related to a synchronization of audio data output timing; wherein the second advertisement message includes force delay information for synchronizing a timing at which the audio data is output from each of the at least one device including the first device; and receiving, from the third device, the audio data, wherein the audio data output timing of each of the at least one device is determined based on the force delay information.

Furthermore in the present disclosure, wherein a value of the force delay information is determined based on a processing time for the audio data of the at least one device.

Furthermore in the present disclosure, wherein the force delay information is determined based on a specific processing time of a specific device having a longest processing time for the audio data among the at least one device.

Furthermore in the present disclosure, wherein the force delay information is determined to indicate (i) a same timing when the specific device completes the processing of the audio data or (ii) a time later than the timing when the specific device completes the processing of the audio data.

Furthermore in the present disclosure, wherein the audio data output timing of each of the at least one device is determined as a timing indicated by the force delay information, wherein the audio data is output at a timing indicated by the force delay information regardless of when processing of the audio data of each of the at least one device is completed.

Furthermore in the present disclosure, a third device for transmitting audio data in a short-range wireless communication system, the third device comprising: a transmitter for transmitting a radio signal; a receiver for receiving a radio signal; and a processor operatively connected to the transmitter and the receiver; wherein the processor is configured to control: the transmitter to transmit, to at least one device, a first advertisement message for providing a broadcast audio data streaming service; the transmitter to transmit, to the at least one device, a second advertisement message related to a synchronization of audio data output timing; wherein the second advertisement message includes force delay information for synchronizing a timing at which the audio data is output from each of the at least one device; and the transmitter to transmit, to the at least one device, the audio data, wherein the audio data output timing of each of the at least one device is determined based on the force delay information.

Furthermore in the present disclosure, a first device for receiving audio data in a short-range wireless communication system, the first device comprising: a transmitter for transmitting a radio signal; a receiver for receiving a radio signal; and a processor operatively connected to the transmitter and the receiver; wherein the processor is configured to control: the receiver to receive, from a third device, a first advertisement message for providing a broadcast audio data streaming service; the receiver to receive, from the third device, a second advertisement message related to a synchronization of audio data output timing; wherein the second advertisement message includes force delay information for synchronizing a timing at which the audio data is output from each of the at least one device including the first device; and the receiver to receive, from the third device, the audio data, wherein the audio data output timing of each of the at least one device is determined based on the force delay information.

Advantageous Effects

According to the present disclosure, there is an effect of transmitting audio data, performed by a third device, using short-range wireless communication in a wireless communication system.

Furthermore, according to the present disclosure, there is an effect of synchronizing audio data output timings of devices that output the audio data, performed by a third device a wireless communication system.

The technical effects of the present disclosure are not limited to the technical effects described above, and other technical effects not mentioned herein may be understood to those skilled in the art to which the present disclosure belongs from the description below.

DESCRIPTION OF DRAWINGS

The accompanying drawings, which are included as part of the detailed description to help the understanding of the present disclosure, provide embodiments of the present disclosure, and together with the detailed description, describe the technical features of the present disclosure.

FIG. 1 is a schematic view illustrating an example of a wireless communication system using a Bluetooth low energy technology to which the present disclosure is applicable.

FIG. 2 illustrates an example of an internal block diagram of a device capable of implementing methods proposed by the present disclosure.

FIG. 3 illustrates an example of a Bluetooth communication architecture to which methods proposed by the present disclosure may be applied.

FIG. 4 illustrates an example of a structure of a generic attribute profile (GATT) of Bluetooth low energy.

FIG. 5 is a flowchart showing an example of a connection procedure method in Bluetooth low energy technology to which the present disclosure may be applied.

FIG. 6 is a diagram illustrating an example of a synchronization method in an audio data transmission using the unicast scheme.

FIG. 7 is a diagram illustrating an example to understand a method for synchronizing the audio data output timings in an audio data transmission using the broadcast scheme proposed in the present disclosure.

FIG. 8 is a diagram illustrating another example to understand a method for synchronizing the audio data output timings in an audio data transmission using the broadcast scheme proposed in the present disclosure.

FIG. 9 is a diagram illustrating another example to understand a method for synchronizing the output timings between the audio data and the video data in an audio data transmission using the broadcast scheme proposed in the present disclosure.

FIG. 10 is a diagram illustrating still another example to understand a method for synchronizing the output timings between the audio data and the video data in an audio data transmission using the broadcast scheme proposed in the present disclosure.

FIG. 11 is a flowchart illustrating an example of an operation implemented in the source device for performing the method of transmitting the audio data by the source device in the wireless communication system proposed in the present disclosure.

FIG. 12 is a flowchart illustrating an example of an operation implemented in the sink device for performing a method of receiving the audio data by the sink device in a wireless communication system proposed in the present disclosure.

MODE FOR DISCLOSURE

In order to help understanding of the present disclosure, the accompanying drawings which are included as a part of the Detailed Description provide embodiments of the present disclosure and describe the technical features of the present disclosure together with the Detailed Description. Like reference numerals principally designate like elements throughout the specification. Further, in describing the present disclosure, a detailed explanation of known related technologies may be omitted to avoid unnecessarily obscuring the subject matter of the present disclosure. Further, it is noted that the accompanying drawings are only for easily understanding the spirit of the present disclosure and it should not be interpreted that the spirit of the present disclosure is limited by the accompanying drawings.

Hereinafter, a method and an apparatus related with the present disclosure will be described in more detail with reference to drawings. In addition, a general term used in the present disclosure should be interpreted as defined in a dictionary or contextually, and should not be interpreted as an excessively reduced meaning. Further, a singular form used in the present disclosure may include a plural form if there is no clearly opposite meaning in the context. In the present application, a term such as "comprising" or "including" should not be interpreted as necessarily including all various components or various steps disclosed in the specification, and it should be interpreted that some component or some steps among them may not be included or additional components or steps may be further included. Suffixes "unit", "module", and "section" for components used in the following description are given or mixed in consideration of easy preparation of the specification only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 illustrates an example of an internal block diagram of a device capable of implementing methods proposed by the present disclosure.

As shown in FIG. 2, the server device 110 includes a display unit 111, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present disclosure.

Furthermore, the client device 120 includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present disclosure.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device 110 or the client device 120, and controls the server device or the client device in order in order to request the transmission of a message through the Bluetooth interface or other interface and to process a received message.

The processors 114 and 124 may be represented by a control section, a control unit, a controller, and the like.

The processors 114 and 124 may include an application-specific integrated circuit (ASIC), another chipset, a logic circuit, and/or a data processing device.

The processors 114 and 124 control the communication unit to receive an Advertisement message from the server device 110, transmit a Scan Request message to the server device 110, control the communication unit to receive a Scan Response message from the server device 110 in response to the scan request, and control the communication unit to transmit a Connect Request message to the server device 110 in order to establish a Bluetooth connection with the server device 110.

In addition, after a Bluetooth LE connection is established through the connection procedure, the processors 114 and 124 control the communication unit so as to read or write data from or in the server device 110 using an attribute protocol.

The memory units 115 and 125 may include a read-only memory (ROM), a random access memory (RAM), a flash memory, a memory card, a storage medium, and/or other storage devices.

The communication units 118 and 127 may include a baseband circuit for processing a radio signal. When the embodiment is implemented by software, the aforementioned technique may be implemented by a module (a process, a function, and the like) that performs the aforementioned function. The module may be stored in the memory unit and executed by the processor.

The memory units 115 and 125 may be positioned inside or outside the processors 114 and 124 and connected with the processors 114 and 124 by various well-known means.

The display units 111 and 121 refer to modules for providing state information of the device and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through low data rate.

FIG. 3 illustrates an example of a Bluetooth communication architecture to which methods proposed by the present disclosure may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth specification using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: A method for providing an alarm service according to the distance.

Proximity: A method for exchanging battery information.

Time: A method for exchanging time information

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE specification, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices may scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scan Intervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i. E., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type field of an advertising channel included in the header supports PDU types defined in Table 1 below.

TABLE 1

| PDU Type | PDU Name | Channel | Permitted PHYs | | |
|---|---|---|---|---|---|
| | | | LE 1M | LE 2M | LE Coded |
| 0000b | ADV_IND | Primary Advertising | ● | | |
| 0001b | ADV_DIRECT_IND | Primary Advertising | ● | | |
| 0010b | ADV_NONCONN_IND | Primary Advertising | ● | | |
| 0011b | SCAN_REQ | Primary Advertising | ● | | |
| | AUX_SCAN_REQ | Secondary Advertising | ● | ● | ● |
| 0100b | SCAN_RSP | Primary Advertising | ● | | |
| 0101b | CONNECT_IND | Primary Advertising | ● | | |
| | AUX_CONNECT_REQ | Secondary Advertising | ● | ● | ● |
| 0110b | ADV_SCAN_IND | Primary Advertising | ● | | |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by the present disclosure.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.

handle: Address of attribute
Type: Type of attribute
Value: Value of attribute
Permission: Access authority to attribute FIG. 5 is a flowchart showing an example of a connection procedure method in Bluetooth low power energy technology to which the present disclosure may be applied.

A server transmits to a client an advertisement message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smartphone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertisement message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK

Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

Hereinafter, a method of transmitting audio data using short-range wireless communication in a wireless communication system will be described in detail.

In the present disclosure, a device that transmits the audio data may be represented as a third device, a control device, a source device, and the like, and representable in various manners within the scope of the same or similar interpretation. In addition, the device that transmits the audio data may be a device capable of outputting video data autonomously, for example, a TV and the like. Moreover, the device that receives and outputs the audio data may be represented as a first device, a second device, a sink device, and the like, and representable in various manners within the scope of the same or similar interpretation. The device that receives audio data may be a speaker and the like.

For the convenience of description, hereinafter, the device that transmits the audio data is commonly referred to as the source device, and the device that receives the audio data is commonly referred to as the sink device.

A method of transmitting audio data using short-range wireless communication in a wireless communication system proposed in the present disclosure may be applied to the case that the source device transmits audio data to at least one sink device, and particularly, may be preferably applied to the case that there are two or more sink devices.

In the present disclosure, the source device may transmit the audio data to the sink device using the unicast scheme and the broadcast scheme (i.e., the source device may provide an audio data streaming service). In the case that the source device transmits (or broadcasts) the audio data using one or more sink devices, the synchronization needs to be made for the timings at which the audio data are output from each of the one or more sink devices. In other words, the timings at which one or more sink devices that receive the audio data output the received audio data need to be synchronized among the one or more sink devices. Hereinafter, a method of synchronizing audio data output timings of the sink devices will be described in detail.

Method of Synchronizing the Audio Data Output Timings of the Sink Devices in an Audio Data Transmission Using the Unicast Scheme (Method 1).

FIG. 6 is a diagram illustrating an example of a synchronization method in an audio data transmission using the unicast scheme.

More specifically, FIG. 6 is related to an example in which the source device transmits the audio data to two sink devices. For the convenience of description, the case that the source device transmits the audio data to two sink devices is described as an example, but the method may also be applied to the case that the source device transmits the audio data to more than two sink devices.

First, the source device may receive a report of an actual presentation time of the sink devices from each of the sink devices (step S610). That is, the source device may receive the delay information related to the actual presentation time related to the processing time required for the sink device to receive the audio data, and decode and output the received audio data from each of the sink devices.

Thereafter, the source device selects the worst case based on the actual presentation times reported from the sink devices, respectively, and transmits an audio data stream with a presentation time stamp in the worst case (step S620). That is, the source device selects a greater value between two actual representation time values based on the actual presentation times received from the sink devices, respectively. The value of the selected actual presentation time may be referred to as force delay information. Thereafter, the source device may transmit the value of the selected actual presentation time (delay time stamp) together with the audio data to the sink devices, respectively.

Thereafter, the audio data may be simultaneously outputted from each of the sink devices at the timing represented by the value of the determined actual presentation time. In this case, the sink device of which the actual presentation time is smaller may store the audio data in its own buffer until the sink device of which the actual presentation time is greater outputs the audio data. In other words, the source device may transfer the force delay information to the sink devices and may forcibly delay the timing at which the sink device outputs the audio data, regardless of whether the sink device is ready to output the audio data.

Method of Synchronizing the Audio Data Output Timings of the Sink Devices in an Audio Data Transmission Using the Broadcast Scheme (Method 2).

FIG. 7 is a diagram illustrating an example to understand a method for synchronizing the audio data output timings in an audio data transmission using the broadcast scheme proposed in the present disclosure.

More specifically, FIG. 7 is an example of the case in which a speaker that outputs the audio data is embedded in the source device, and a display that outputs video data related to the audio data is embedded.

In FIG. 7, the source device needs to synchronize the video data output timing with the audio data output timing, which are autonomously outputted.

The processing time for outputting the video data of the source device may be longer than the processing time for outputting the audio data. Here, the processing time for outputting the video data may be a time consumed for the source device to perform a series of specific operations for outputting the video data. More specifically, the source device may perform the specific operations after completing decoding of the video data. On the other hand, since the audio data may be outputted immediately after decoding, the processing time for outputting the audio data may be shorter than the processing time for outputting the video data. Here, the specific operations may include an operation for picture quality enhancement, a frame doubling operation, and the like.

(Proposal 1) Synchronization Method Based on the Audio Data Processing Time of the Sink Device The present proposal relates to a method for synchronizing the timings at which the audio data are output from the sink devices, respectively.

More specifically, the source device may control the sink devices to output the audio data at the same timing based on the audio data processing time of the sink devices.

FIG. 8 is a diagram illustrating another example to understand a method for synchronizing the audio data output timings in an audio data transmission using the broadcast scheme proposed in the present disclosure.

More specifically, FIG. 8 is related to an example in which the source device transmits the audio data to two sink devices. For the convenience of description, the case that the source device transmits the audio data to two sink devices is described as an example, but the method may also be applied to the case that the source device transmits the audio data to more than two sink devices.

First, the source device transmits broadcast TV meta data including a force delay value to two sink devices (step S810). More specifically, the broadcast TV meta data including the force delay value may be included to an advertisement message and transmitted to the sink devices. In this case, the advertisement message may be transmitted on a secondary channel. Furthermore, the force delay value may be referred to as force delay information and representable in various manners within the scope of the same or similar interpretation.

Here, different from the method of synchronizing the audio data output timings of the sink devices in the unicast method, the source device does not receive separate information for determining the force delay value from the sink devices. In order to determine the force delay value, the source device may select an appropriate specific value as the force delay value within a preconfigured range of the force delay value based on the processing times of the sink devices. Here, the range of the force delay value may be a time expected for all sink devices to complete the processing for the audio data. In addition, the selected force delay value may be selected by the source device based on big data. The big data may be established based on an experience for the source device to transmit the audio data to the sink device.

In the case that the processing for the audio data of all the sink devices is not completed at the timing at which the force delay value selected by the source device is indicated, the source device may not perform the operation for a separate modification to reconfigure the force delay value to the sink devices. That is, in the case that processing for the audio data is not completed in all the sink devices at the timing indicated by the force delay value, the synchronization for the audio data output timing among the sink devices may not be performed, and the processing is completed in the sink devices that fail to complete the processing for the audio data after a predetermined time, and accordingly, all the sink devices may output the audio data.

Also, although it is not shown in FIG. 8, before step S810, the source device may transmit the advertisement message for providing a broadcast audio data streaming service to the sink devices.

Thereafter, the source device transmits the audio data to the sink devices (step S820). Here, the received audio data may be outputted at the same timing from each of the sink devices based on the force delay value. That is, the audio data output timing from each of the sink devices may be determined as a timing indicated by the force delay value. Here, regardless of the actual timing at which the sink devices complete the processing for the audio data, the sink device forcibly delays the audio data output timing by the timing indicated by the force delay value to output the audio data.

(Proposal 2) Synchronization Method Further Based on the Video Data Processing Time of the Source Device The present proposal relates to a method for synchronizing timings at which the audio data is output from the sink device and timings at which the video data related to the audio data is output from the source device.

More specifically, the source device may control the audio data of the sink devices and the video data of the source device to be output at the same timing based on the audio data processing time of the sink device and further based on the processing time for the video data of the source device. That is, when the video data is output from the source device, the audio data may be output from the sink device.

FIG. 9 is a diagram illustrating another example to understand a method for synchronizing the output timings between the audio data and the video data in an audio data transmission using the broadcast scheme proposed in the present disclosure.

More specifically, FIG. 9 relates to an example of the case that the source device transmits the audio data to one or more, particularly, two or more sink devices, and the source device outputs the video data related to the audio data.

Unlike the case of FIG. 7 in which the source device synchronizes the audio data output timing and the video data output timing autonomously, in the case that the source device transmits the audio data to the sink devices to output the audio data, the processing time for the audio data may be longer than the processing time for the video data of the source device. That is, the processing time required for the audio data received by the sink device to be output may be longer than the processing time for outputting the video data from the source device. In this case, processing times in each of the sink devices may be different from each other.

FIG. 9(*a*) relates to the case that the synchronization between the video data output timing of the source device and the audio data output timing of the sink device is not established.

In the case that the source device outputs the audio data and the video data autonomously, the audio data output timing and the output timing of the video data may be synchronized at the timing denoted by "911" shown in FIG. 9. However, in the case that the source device transmits the audio data to the sink device and the sink device outputs the audio data, the processing for outputting the audio data of the sink devices is completed at the timing denoted by "912" shown in FIG. 9(*a*). In this case, the audio data and the video data are in an out of Lipsync state between the timing denoted by "911" shown in FIG. 9 and the timing denoted by "912" shown in FIG. 9(*a*). That is, while the video data is outputted from the source device, the audio data from the sink device is in a state of not being outputted.

FIG. 9(*b*) relates to the case that the synchronization between the video data output timing of the source device and the audio data output timing of the sink device is established.

As described in FIG. 9(*a*), the audio data output timing and the video data output timing are not synchronized at the timing denoted by "921" shown in FIG. 9(*b*). In FIG. 9(*b*), since the audio data and the video data may be synchronized and outputted at the timing denoted by "922", the source device may determine a value expected as a timing at which the processing for the audio data is completed in all the sink devices to be the force delay value. The processing time may be a time at which encoding/decoding/transport for the audio data is performed. The source device transmits the determined force delay value to the sink devices and outputs the audio data at the timing denoted by "922" shown in FIG. 9(*b*) based on the force delay value, and the output timings of the audio data and the video data may be synchronized. Here, the output timing of the audio data may also be outputted at the timing denoted by "922" shown in FIG. 9(*b*) based on the force delay value.

FIG. 10 is a diagram illustrating still another example to understand a method for synchronizing the output timings between the audio data and the video data in an audio data transmission using the broadcast scheme proposed in the present disclosure.

FIG. 10(*a*) relates to the case that the processing for the audio data output of the source device (TV) is completed, and the processing times for outputting the audio data received by the sink devices (receivers) are different with each other.

In FIG. 10(*a*), since the source device completes the processing for the video data output, the source device may output the video data. On the other hand, for the audio data, delay occurs as much as the time for the source device to encode the audio data and transmit the audio data to the sink device. Additionally, the additional delay for the processing occurs from the timing at which the sink device receives the audio data, and the delay for the processing has a different value for each of the sink devices. In this case, although the source device simultaneously transmits the audio data, the audio data are output at different timings from the respective sink devices. That is, after the time delay for encoding and transmitting the audio data by the source device, the audio data are sequentially outputted from the sink device in which the processing for the audio data is firstly completed.

FIG. 10(*b*) relates to the case that the video data output timing of the source device (TV) and the respective audio data output timings of the sink devices are synchronized (matched).

More specifically, the source device transmits the force delay value to the sink devices for synchronizing the audio data output timing from the sink device and the video data output timing from the source device. In this case, the force delay value may be included to the advertisement message and transmitted.

Here, the force delay value may be determined based on the processing time for the audio data of the sink devices and further based on the processing time for the video data of the source device. More specifically, in the case that the source device determines that the timing at which the processing for the video data of the source device is completed is later than the timing at which the processing for the audio data is completed for all the sink devices, the force delay value may be determined to be a value indicating the timing equal to or later than the timing at which the processing for the video data is completed. On the other hand, in the case that the source device determines that the timing at which the processing for the video data of the source device is completed is earlier than the timing at which processing for the audio data is completed for all sink devices, the force delay value may be determined to be a value indicating the timing equal to or later than the timing at which the processing for the audio data is completed (or expected to be completed) for all the sink devices.

Here, the source device may output the video data based on the force delay value. That is, the source device may output the video data at the timing indicated by the force delay value. In addition, the audio data may be outputted at the timing indicated by the force delay information regardless of the timing at which the processing for the audio data of each of the sink devices is completed, and the video data may be outputted at the timing indicated by the force delay information regardless of the timing at which the processing for the video data of the source device is completed.

The force delay value may be greater than the sum of the audio data encoding time of the source device and the audio data transmission time from the source device to the sink device, and less than the video data buffering time of the source device.

FIG. 11 is a flowchart illustrating an example of an operation implemented in the source device for performing the method of transmitting the audio data by the source device in the wireless communication system proposed in the present disclosure.

More specifically, the source device transmits a first advertisement message for providing a broadcast audio data streaming service to at least one device (step S1110).

Thereafter, the source device transmits a second advertisement message related to the synchronization of the audio data output timing to the at least one device (step S1120).

Here, the second advertisement message includes the force delay information for synchronizing the timings at which the audio data is outputted from each of the at least one device.

Thereafter, the source device transmits the audio data to the at least one device (step S1130).

In this case, the audio data output timing from the at least one device is determined based on the force delay information.

FIG. 12 is a flowchart illustrating an example of an operation implemented in the sink device for performing a method of receiving the audio data by the sink device in a wireless communication system proposed in the present disclosure.

More specifically, the sink device receives a first advertisement message for providing a broadcast audio data streaming service from a third device (step S1210).

Thereafter, the sink device receives a second advertisement message related to the synchronization of the audio data output timing from the third device (step S1220).

Here, the second advertisement message includes the force delay information for synchronizing the timing at which the audio data is outputted (from each of the at least one device including the first device).

Thereafter, the sink device receives the audio data from the third device (step S1230).

In this case, the audio data output timing of the at least one device is determined based on the force delay information.

It is apparent to those skilled in the art that the present disclosure can be embodied in other specific forms without departing from the essential characteristics of the present disclosure. Accordingly, the foregoing detailed description should not be construed as restrictive in all respects but as exemplary. The scope of the present disclosure should be determined by a reasonable interpretation of the appended claims, and all modifications within the equivalent scope of the present disclosure are included in the scope of the present disclosure.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present disclosure may be implemented by various means, for example, hardware, firmware, software or a combination of them. In the case of implementations by hardware, an embodiment of the present disclosure may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present disclosure may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure. Further, although the disclosure has described both product disclosures and process disclosures, description of both disclosures may be complementarily applied as needed.

INDUSTRIAL APPLICABILITY

The preferred embodiments of the present disclosure described above are disclosed for an exemplary purpose, and modifications, changes, substitutions, or additions of various other embodiments may be hereinafter made by those skilled in the art within the technical spirit and the technical scope of the present disclosure disclosed in the appended claims.

The invention claimed is:

1. A method of transmitting audio data, by a third device, in a short-range wireless communication system, the method comprising:
   transmitting, to at least one device, a first advertisement message for providing a broadcast audio data streaming service;
   determining a value of presentation delay information based on a processing time for the audio data of the at least one device;
   transmitting, to the at least one device, a second advertisement message related to a synchronization of audio data output timing;
   wherein the second advertisement message includes the presentation delay information, the presentation delay information being for synchronizing a timing at which the audio data is output from each of the at least one device; and
   transmitting, to the at least one device, the audio data,
   wherein the audio data output timing of each of the at least one device is determined based on the presentation delay information,
   wherein the presentation delay information is determined based on a specific time value range in which processing for the audio data is expected to be completed in all of the at least one device and a processing time for a video data related to the audio data of the third device, and
   outputting the video data,
   wherein a video data output timing of the third device is determined based on the presentation delay information,
   wherein the audio data is output at a timing indicated by the presentation delay information regardless of when a processing for the audio data of each of the at least one device is completed, and
   wherein the video data is output at the timing indicated by the presentation delay information regardless of when a processing for the video data of the third device is completed,
   wherein a value of the presentation delay information is greater than a sum of (i) an audio data encoding time of the third device and (ii) an audio data transmission time from the third device to the at least one device, and less than a video data buffering time of the third device.

2. The method of claim 1,
   wherein the specific time value range is pre-configured, wherein the presentation delay information is determined as a specific value among values included within the specific time value range.

3. The method of claim 2,
wherein the audio data output timing of each of the at least one device is determined as a timing indicated by the presentation delay information.

4. The method of claim 3,
wherein the audio data is output at the timing indicated by the presentation delay information regardless of when the processing for the audio data of each of the at least one device is completed.

5. A third device for transmitting audio data in a short-range wireless communication system, the third device comprising:
   a transmitter for transmitting a radio signal;
   a receiver for receiving a radio signal; and
   a processor operatively connected to the transmitter and the receiver;
   wherein the processor is configured to control:
   the transmitter to transmit, to at least one device, a first advertisement message for providing a broadcast audio data streaming service;
   the transmitter to transmit, to the at least one device, a second advertisement message related to a synchronization of audio data output timing;
   wherein the second advertisement message includes force delay information for synchronizing a timing at which the audio data is output from each of the at least one device; and
   the transmitter to transmit, to the at least one device, the audio data,
   wherein the audio data output timing of each of the at least one device is determined based on the force delay information,
   wherein the presentation delay information is determined based on a specific time value range in which processing for the audio data is expected to be completed in all of the at least one device and a processing time for a video data related to the audio data of the third device, and
   outputting the video data,
   wherein a video data output timing of the third device is determined based on the presentation delay information,
   wherein the audio data is output at a timing indicated by the presentation delay information regardless of when a processing for the audio data of each of the at least one device is completed, and
   wherein the video data is output at the timing indicated by the presentation delay information regardless of when a processing for the video data of the third device is completed,
   wherein a value of the presentation delay information is greater than a sum of (i) an audio data encoding time of the third device and (ii) an audio data transmission time from the third device to the at least one device, and less than a video data buffering time of the third device.

6. A first device for receiving audio data in a short-range wireless communication system, the first device comprising:
   a transmitter for transmitting a radio signal;
   a receiver for receiving a radio signal; and
   a processor operatively connected to the transmitter and the receiver;
   wherein the processor is configured to control:
   the receiver to receive, from a third device, a first advertisement message for providing a broadcast audio data streaming service;
   the receiver to receive, from the third device, a second advertisement message related to a synchronization of audio data output timing;
   wherein the second advertisement message includes force delay information for synchronizing a timing at which the audio data is output from each of the at least one device including the first device; and
   the receiver to receive, from the third device, the audio data,
   wherein the audio data output timing of each of the at least one device is determined based on the force delay information,
   wherein the presentation delay information is determined based on a specific time value range in which processing for the audio data is expected to be completed in all of the at least one device and a processing time for a video data related to the audio data of the third device, and
   outputting the video data,
   wherein a video data output timing of the third device is determined based on the presentation delay information,
   wherein the audio data is output at a timing indicated by the presentation delay information regardless of when a processing for the audio data of each of the at least one device is completed, and
   wherein the video data is output at the timing indicated by the presentation delay information regardless of when a processing for the video data of the third device is completed,
   wherein a value of the presentation delay information is greater than a sum of (i) an audio data encoding time of the third device and (ii) an audio data transmission time from the third device to the at least one device, and less than a video data buffering time of the third device.

* * * * *